(12) United States Patent
Kim et al.

(10) Patent No.: US 10,637,047 B2
(45) Date of Patent: Apr. 28, 2020

(54) POSITIVE ACTIVE MATERIAL FOR RECHARGEABLE LITHIUM BATTERY AND RECHARGEABLE LITHIUM BATTERY INCLUDING THE SAME

(71) Applicant: Samsung SDI Co., Ltd., Yongin-si, Gyeonggi-do (KR)

(72) Inventors: Jihyun Kim, Yongin-si (KR); Changwook Kim, Yongin-si (KR); Sooyoun Park, Yongin-si (KR); Kyouyoon Sheem, Yongin-si (KR); Hyunjoo Je, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 12 days.

(21) Appl. No.: 15/722,953

(22) Filed: Oct. 2, 2017

(65) Prior Publication Data

US 2018/0102537 A1 Apr. 12, 2018

(30) Foreign Application Priority Data

Oct. 6, 2016 (KR) .................. 10-2016-0129070

(51) Int. Cl.

| H01M 4/36 | (2006.01) |
|---|---|
| H01M 4/62 | (2006.01) |
| H01M 4/131 | (2010.01) |
| H01M 4/485 | (2010.01) |
| H01M 4/38 | (2006.01) |
| H01M 4/134 | (2010.01) |
| C01G 51/00 | (2006.01) |
| H01M 10/052 | (2010.01) |
| H01M 4/02 | (2006.01) |
| H01M 10/0525 | (2010.01) |
| H01M 2/26 | (2006.01) |
| C01G 23/047 | (2006.01) |

(52) U.S. Cl.
CPC ............ *H01M 4/366* (2013.01); *C01G 51/42* (2013.01); *H01M 4/131* (2013.01); *H01M 4/134* (2013.01); *H01M 4/386* (2013.01); *H01M 4/485* (2013.01); *H01M 4/62* (2013.01); *C01G 23/047* (2013.01); *C01P 2002/50* (2013.01); *C01P 2002/54* (2013.01); *C01P 2004/03* (2013.01); *C01P 2004/62* (2013.01); *C01P 2004/64* (2013.01); *C01P 2004/82* (2013.01); *H01M 2/263* (2013.01); *H01M 4/623* (2013.01); *H01M 10/052* (2013.01); *H01M 10/0525* (2013.01); *H01M 2004/028* (2013.01)

(58) Field of Classification Search
None
See application file for complete search history.

(56) References Cited

U.S. PATENT DOCUMENTS

| 2012/0156565 A1* | 6/2012 | Kim ................ H01M 4/0471 429/221 |
| 2013/0122369 A1* | 5/2013 | Kim ................ H01M 4/38 429/219 |
| 2014/0162132 A1 | 6/2014 | Ishii et al. |

FOREIGN PATENT DOCUMENTS

| JP | 2014-116111 A | 6/2014 |
| KR | 10-2014-0081741 A | 7/2014 |
| KR | 10-2015-0021835 A | 3/2015 |

* cited by examiner

Primary Examiner — Sin J Lee
(74) Attorney, Agent, or Firm — Lewis Roca Rothgerber Christie LLP (57) ABSTRACT

A positive active material for a rechargeable lithium battery and a rechargeable lithium battery including the same are provided. The positive active material includes a lithium intercalation compound and a Si-containing $TiO_2$ present on the surface of the compound. When $TiO_2$ is present on the surface of the lithium intercalation compound, the rate characteristics and low temperature characteristics of batteries including the lithium intercalation compound may be improved. Further, when Si-containing $TiO_2$ is present on the surface of the lithium intercalation compound, the cycle-life characteristic and high temperature storage characteristics of batteries including the lithium intercalation compound may be further improved, compared to batteries having only $TiO_2$. As such, the positive active material including Si-containing $TiO_2$ provides a rechargeable lithium battery having excellent rate capability, low temperature characteristics, cycle-life characteristics and high temperature storage characteristics.

16 Claims, 8 Drawing Sheets

POSITIVE ACTIVE MATERIAL FOR RECHARGEABLE LITHIUM BATTERY AND RECHARGEABLE LITHIUM BATTERY INCLUDING THE SAME

CROSS-REFERENCE TO RELATED APPLICATION

This application claims priority to and the benefit of Korean Patent Application No. 10-2016-0129070 filed in the Korean Intellectual Property Office on Oct. 6, 2016, the entire content of which is incorporated herein by reference.

BACKGROUND

1. Field

Aspects of example embodiments of the present disclosure are directed toward a positive active material for a rechargeable lithium battery and a rechargeable lithium battery including the same.

2. Description of the Related Art

Rechargeable lithium batteries have recently drawn attention as power sources for small portable electronic devices. Rechargeable lithium batteries use an organic electrolyte solution and have discharge voltages that are at least twice as high as conventional batteries using an alkali aqueous electrolyte solution, and accordingly have higher energy densities.

Lithium-transition metal oxides having a structure capable of intercalating lithium ions (such as $LiCoO_2$, $LiMn_2O_4$, $LiNi_{1-x}Co_xO_2$ (0<x<1), and/or the like) have been used as positive active materials in rechargeable lithium batteries.

Various suitable carbon-based materials capable of intercalating and deintercalating lithium ions, including artificial graphite, natural graphite, hard carbon, and/or oxides (such as tin oxides or lithium vanadium-based oxides) have been used as negative active materials.

SUMMARY

Aspects of embodiments of the present disclosure are directed toward a positive active material for a rechargeable lithium battery having improved rate capability, cycle-life characteristics, and storage characteristics at high temperatures.

Aspects of embodiments of the present disclosure are directed toward a rechargeable lithium battery including the positive active material.

Embodiments of the present disclosure provide a positive active material for a rechargeable lithium battery including a lithium intercalation compound and a silicon (Si)-containing titanium dioxide ($TiO_2$) on the surface of the compound.

The Ti may be included in a molar amount of about 0.05 mol % to about 2.0 mol % based on 100 mol % of the lithium intercalation compound.

The Si may be included in a molar amount of about 0.1 mol % to about 25 mol % based on 100 mol % of the Ti.

The Si-containing $TiO_2$ may be included in an amount of about 0.04 wt % to about 1.6 wt % based on 100 wt % of the lithium intercalation compound.

The Si-containing $TiO_2$ may have an average particle diameter (D50) of about 10 nm to about 300 nm.

The Si-containing $TiO_2$ may have a layer-type or island-type form.

The Si-containing $TiO_2$ may be present on the surface of the lithium intercalation compound in a thickness of about 20 nm to about 300 nm.

The lithium intercalation compound may have an average particle diameter (D50) of about 15 μm to about 20 μm.

Embodiments of the present disclosure provide a rechargeable lithium battery including a positive electrode including the positive active material; a negative electrode including a negative active material; and an electrolyte.

Other example embodiments are described and included in the following detailed description.

A positive active material for a rechargeable lithium battery according to one or more embodiments of the present disclosure has improved rate capability, cycle-life characteristics, and high temperature storage characteristics.

BRIEF DESCRIPTION OF THE DRAWINGS

These and/or other aspects will become apparent and more readily appreciated from the following description of the example embodiments, taken in conjunction with the accompanying drawings.

DETAILED DESCRIPTION

Reference will now be made in more detail to example embodiments, examples of which are illustrated in the accompanying drawings, wherein like reference numerals refer to like elements throughout and duplicative descriptions thereof may not be provided. In this regard, the present example embodiments may have different forms and should not be construed as being limited to the descriptions set forth herein. Accordingly, the example embodiments are merely described below, by referring to the figures, to explain aspects of the present description. Expressions such as "at least one of", "one of", and "selected from", when preceding a list of elements, modify the entire list of elements and do not modify the individual elements of the list.

It will be understood that when a layer, region, or component is referred to as being "on", "provided on", "positioned on", or "formed on" another layer, region, or component, it can be directly or indirectly formed on the other layer, region, or component. That is, for example, intervening layers, regions, or components may be present. The sizes and thicknesses of elements in the drawings may be exaggerated for convenience of explanation. In other words, since sizes and thicknesses of components in the drawings are arbitrarily illustrated for convenience of explanation, the following embodiments are not limited thereto.

It will be understood that when a layer, region, or component is described as being connected to another portion of the embodiment, the layer, region, or component may be directly connected to the portion of the embodiment, or an intervening layer, region, or component may exist. For example, when a layer, region, or component is described as being connected to another portion of the embodiment, the layer, region, or component may be directly connected to the portion of the embodiment, or may be indirectly connected to the portion of the embodiment through another layer, region, or component.

It will be understood that although the terms "first", "second", etc. may be used herein to describe various components, these components should not be limited by these terms. These components are only used to distinguish one component from another. An expression used in the singular encompasses the expression of the plural, unless it has a clearly different meaning in the context. In addition, it will be understood that when a unit is referred to as "comprising" another element, it may not exclude other elements but may further include other elements unless specifically indicated otherwise.

A positive active material for a rechargeable lithium battery according to one or more embodiments of the present disclosure includes a lithium intercalation compound and a Si-containing $TiO_2$ present on the surface of the compound.

When $TiO_2$ is present on the surface of the lithium intercalation compound, the rate characteristics and low temperature characteristics of batteries including the lithium intercalation compound may be improved. Further, when Si-containing $TiO_2$ is present on the surface of the lithium intercalation compound, the cycle-life characteristic and high temperature storage characteristics of batteries including the lithium intercalation compound may be further improved, compared to batteries having only $TiO_2$. As such, the positive active material including both $TiO_2$ and Si according to embodiments of the present disclosure may provide a rechargeable lithium battery having excellent high rate capability, low temperature characteristics, cycle-life characteristics, and high temperature storage characteristics.

The Ti may be included in a molar amount of about 0.05 mol % to about 2.0 mol %, for example about 0.5 mol % to about 1 mol % based on 100 mol % of the lithium intercalation compound. When the amount of Ti is within these ranges, the resistance of a positive electrode including a positive active material may be reduced, and thus rate capability may be improved.

The Si may be included in a molar amount of about 0.1 mol % to about 25 mol %, for example about 1 mol % to about 15 mol % based on 100 mol % of the Ti. When the amount of Si is within these ranges, cycle-life characteristics and high temperature storage characteristics may be improved.

The Si-containing $TiO_2$ may be included in an amount of about 0.04 wt % to about 1.6 wt %, for example about 0.4 wt % to about 0.8 wt % based on 100 wt % of the lithium intercalation compound. When the content of the Si-containing $TiO_2$ is within these ranges, cycle-life characteristics may be improved.

The Si-containing $TiO_2$ may have an average particle diameter (D50) of about 10 nm to about 300 nm. When the average particle diameter (D50) of the Si-containing $TiO_2$ is within this range, battery characteristics may be improved because Li transmission (e.g., diffusion) is not interrupted during charge and discharge. As used herein, when a definition is not otherwise provided, an average particle diameter (D50) indicates a diameter of a particle where an accumulated volume is about 50 volume % in a particle distribution (e.g., the diameter of a particle having a size in the 50th percentile of the distribution of particle sizes).

The Si-containing $TiO_2$ may be on the surface of the lithium intercalation compound in the form of a continuous layer (e.g., layer structure) or in the form of a non-continuous layer including island shapes (e.g., island-type structure).

The Si-containing $TiO_2$ may be present on the surface of the lithium intercalation compound in a thickness of about 20 nm to about 300 nm. When the Si-containing $TiO_2$ has a thickness within this range, the electrochemical characteristics may be further improved while the Si-containing $TiO_2$ does not function as a resist (e.g., does not detrimentally increase battery resistance). When the Si-containing $TiO_2$ is present in an island-type form or structure, the thickness may be near or substantially similar to the average particle diameter (D50) of the used Si-containing $TiO_2$, but is embodiments of the present disclosure are not limited thereto.

The lithium intercalation compound may have an average particle diameter (D50) of about 15 μm to about 20 μm. When the average particle diameter (D50) of the lithium intercalation compound is within this range, the resulting active mass density of a positive electrode may be improved, and a battery energy density may be improved.

The lithium intercalation compound (lithiated intercalation compound) may be a compound capable of intercalating and deintercalating lithium. In some embodiments, one or more composite oxides including lithium and a metal selected from cobalt, manganese, nickel, and combinations thereof may be used. More specifically, the compounds represented by one of the following Chemical Formulae may be used: $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 < \alpha \leq 2$); $Li_aNi_{1-b-c}Co_bX_bO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Co_bX_bO_{2-\alpha}T_2$ ($0.90 \leq a \leq 1.8$, $0 \leq b \leq 13.5$, $0 \leq c \leq 0.05$, $0 < \alpha < 2$); $Li_aNi_{1-b-c}Mn_bX_cD_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 < \alpha < 2$); $Li_aNi_{1-b-c}Mn_bX_cO_{2-\alpha}T_2$ ($0.90 \leq a \leq 1.8$, $0 \leq b \leq 13.5$, $0 \leq c \leq 0.05$, $0 < \alpha < 2$); $Li_aNi_bE_cG_{(d)}O_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_{(e)}O_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$) $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMn_2G_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and/or $Li_aFePO_4$ ($0.90 \leq a \leq 1.8$)

In the chemical formulae, A may be selected from Ni, Co, Mn, and combinations thereof; X may be selected from Al, Ni, Co, Mn, Cr, Fe, Mg, Sr, V, a rare earth element, and combinations thereof; D may be selected from O, F, S, P, and combinations thereof; E may be selected from Co, Mn, and combinations thereof; T may be selected from F, S, P, and combinations thereof; G may be selected from Al, Cr, Mn, Fe, Mg, La, Ce, Sr, V, and combinations thereof; Q may be selected from Ti, Mo, Mn, and combinations thereof; Z may be selected from Cr, V, Fe, Sc, Y, and combinations thereof; and J may be selected from V, Cr, Mn, Co, Ni, Cu, and combinations thereof.

The compounds may include a surface coating layer, or may be mixed with another compound having a surface coating layer. The coating layer may include at least one compound selected from an oxide of the coating element, a hydroxide of the coating element, an oxyhydroxide of the coating element, an oxycarbonate of the coating element, and a hydroxyl carbonate of the coating element. The compound for the coating layer may be amorphous or crystalline. The coating element included in the coating layer may include magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof, as long as it does not have an adverse influence on the properties of the positive active material. The coating layer may be disposed utilizing any suitable method that does not have an adverse influence on the properties of the positive active material. For example, the method may include any coating method such as spray coating, dipping, and/or the like. These methods are well-known in the art, and will not be illustrated in more detail.

The positive active material according to one or more embodiments of the present disclosure may be prepared according to a dry process using no solvent or according to a wet process using a solvent. The dry process may be performed by mixing Si-containing $TiO_2$ and a lithium intercalation compound.

The speed and the time of the mixing process may be appropriately or suitably adjusted to a level sufficient to uniformly mix the active material while preventing or reducing damage to the surface of the lithium intercalation compound. The mixing may be performed, for example, at a speed of about 1000 rpm to about 5000 rpm and for about 1 minute to about 10 minutes. However, embodiments of the present disclosure are not limited thereto.

The wet process may be performed by mixing Si—$TiO_2$ and the lithium intercalation compound in a solvent, filtering the mixture, and drying the same. The solvent may be water, ethanol, acetone, or a combination thereof. The mixing process may be performed at room temperature (e.g., about 20-30° C.) for about 1 hour to about 3 hours, and the drying process may be performed at about 150° C. to about 250° C. The drying process may be performed for about 24 hour or longer until the solvent is sufficiently removed, and the maximum drying time is not limited.

After the dry process or the wet process, a sieving process may be performed (e.g., to select positive active material particles having a suitable particle diameter).

The Si-containing $TiO_2$ may be obtained by mixing Si particles and $TiO_2$ particles at a weight ratio of about 0.08 wt %:99.92 wt % to about 16 wt %:84 wt % and heat-treating the mixture at about 600° C. to about 900° C. The heat treatment may be performed under an air atmosphere and may be performed for about 5 hours to about 10 hours. When the heat treatment is performed under the conditions, it may provide uniform Si-containing $TiO_2$ particles having a suitable diameter.

The Si particles may have an average particle diameter (D50) of about 10 nm to about 100 nm, and the $TiO_2$ particles may have an average particle diameter (D50) of about 30 nm to about 300 nm. When the average particle diameters (D50) of the Si particle and the $TiO_2$ particle are both within these ranges, the particles may improve the battery characteristics instead increasing resistance in the battery when coated on the surface of the lithium intercalation compound.

The Si particles may be amorphous Si particles or may be crystalline Si particles.

Embodiments of the present disclosure provide a rechargeable lithium battery including a positive electrode including the positive active material, a negative electrode including a negative active material, and an electrolyte.

The positive electrode may include a current collector and a positive active material layer disposed on the current collector and including the positive active material. The positive active material may be included in an amount of about 90 wt % to about 98 wt % based on 100 wt % of the positive active material layer.

In an embodiment, the positive active material layer may further include a binder and a conductive material. Herein, the binder and the conductive material may each be included in an amount of about 1 wt % to about 5 wt %, based on the total amount of the positive active material layer.

The binder may improve the binding properties of the positive active material particles with one another and with the current collector. Non-limiting examples of the binder may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like.

The conductive material may be included to promote electrode conductivity. Any electrically conductive material may be used as a conductive material unless it causes a chemical change (e.g., an undesirable chemical reaction in the positive active material). Non-limiting examples of the conductive material may include a carbon-based material (such as natural graphite, artificial graphite, carbon black, acetylene black, Ketjenblack, a carbon fiber, and/or the like); a metal-based material of a metal powder or a metal fiber including copper, nickel, aluminum, silver, and/or the like; a conductive polymer (such as a polyphenylene derivative); or mixtures thereof.

The current collector may include Al, but embodiments of the present disclosure are not limited thereto.

The negative electrode may include a current collector and a negative active material layer formed on the current collector and including a negative active material.

The negative active material may include a material that reversibly intercalates and deintercalates lithium ions, a lithium metal, a lithium metal alloy, a material capable of doping and dedoping lithium, and/or a transition metal oxide.

The material that can reversibly intercalate and deintercalate lithium ions may include a carbon material. The carbon material may be any suitable or available carbon-based negative active material in a lithium ion rechargeable battery. Non-limiting examples of the carbon material include crystalline carbon, amorphous carbon, and mixtures thereof. The crystalline carbon may be non-shaped (e.g., may not have any particular shape), or may be sheet, flake, spherical, or fiber shaped natural graphite or artificial graphite. The amorphous carbon may be a soft carbon, a hard carbon, a mesophase pitch carbonization product, fired coke, and/or the like.

Non-limiting examples of the lithium metal alloy may include lithium and an element selected from sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), tin (Sn), and mixtures thereof.

The material capable of doping and dedoping lithium may include Si, a Si—C composite, $SiO_x$ (0<x<2), a Si-Q alloy (wherein Q is an element selected from an alkali metal, an alkaline-earth metal, a Group 13 element, a Group 14 element excluding Si, a Group 15 element, a Group 16 element, a transition metal, a rare earth element, and combinations thereof), Sn, $SnO_2$, a Sn—R alloy (wherein R is an element selected from an alkali metal, an alkaline-earth metal, a Group 13 element, a Group 14 element excluding Sn, a Group 15 element, a Group 16 element, a transition metal, a rare earth element, and combinations thereof,), and/or the like. At least one of these materials may be mixed with $SiO_2$. The elements Q and R may be selected from Mg, Ca, Sr, Ba, Ra, scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), B, Al, Ga, Sn, In, thallium (Tl), Ge, phosphorus (P), arsenic (As), antimony (Sb), bismuth (Bi), sulfur (S), selenium (Se), tellurium (Te), polonium (Po), and combinations thereof.

The transition metal oxide may include vanadium oxide, lithium vanadium oxide, or lithium titanium oxide.

In the negative active material layer, the negative active material may be included in an amount of about 95 wt % to about 99 wt % based on the total weight of the negative active material layer.

The negative active material layer may include a binder and/or a conductive material. The binder may be included in an amount of about 1 wt % to about 5 wt % based on the total weight of the negative active material layer. When the negative active material layer includes a conductive material, the negative active material layer may include about 90 wt % to about 98 wt % of the negative active material, about 1 wt % to about 5 wt % of the binder, and about 1 wt % to about 5 wt % of the conductive material.

The binder may improve the binding properties of the negative active material particles with one another and with the current collector. The binder may include a non-water-soluble binder, a water-soluble binder, or a combination thereof.

The non-water-soluble binder may be selected from polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or combinations thereof.

The water-soluble binder may be selected from a styrene-butadiene rubber, an acrylated styrene-butadiene rubber (SBR), an acrylonitrile-butadiene rubber, an acrylic rubber, a butyl rubber, a fluorine rubber, an ethylene propylene copolymer, polyvinylpyrrolidone, polyepichlorohydrin, polyphosphazene, polyacrylonitrile, polystyrene, an ethylene propylenediene copolymer, polyvinylpyridine, chlorosulfonated polyethylene, latex, polyester resin, an acrylic resin, phenolic resin, an epoxy resin, polyvinyl alcohol, and combinations thereof.

When the water-soluble binder is used as a negative electrode binder, a cellulose-based compound may be further used to provide viscosity as a thickener. The cellulose-based compound may include one or more of carboxylmethyl cellulose, hydroxypropylmethyl cellulose, methyl cellulose, or alkali metal salts thereof. The alkali metal salts may include Na, K, and/or Li. The thickener may be included in an amount of about 0.1 parts by weight to about 3 parts by weight based on 100 parts by weight of the negative active material.

The conductive material may be included to provide or increase electrode conductivity. Any electrically conductive material may be used as a conductive material unless it causes a chemical change (e.g., an undesirable chemical reaction in the negative active material). Non-limiting examples of the conductive material may include a carbon-based material such as natural graphite, artificial graphite, carbon black, acetylene black, Ketjenblack®, a carbon fiber, and/or the like; a metal-based material of a metal powder or a metal fiber including copper, nickel, aluminum, silver, and/or the like; a conductive polymer such as a polyphenylene derivative; or mixtures thereof.

The current collector may include one selected from a copper foil, a nickel foil, a stainless steel foil, a titanium foil, a nickel foam, a copper foam, a polymer substrate coated with a conductive metal, and combinations thereof, but embodiments of the present disclosure are not limited thereto.

The negative electrode and the positive electrode may be respectively manufactured by mixing each active material, a conductive material, and/or a binder in a solvent to prepare an active material composition, and coating each active material composition on a current collector. Suitable electrode manufacturing methods are well known, and are not described in detail in the present specification. The solvent may include N-methylpyrrolidone and/or the like, but embodiments of the present disclosure are not limited thereto. When the negative electrode uses a water-soluble binder, the solvent for preparing a negative active composition may be water.

The electrolyte may include a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, and/or aprotic solvent.

The carbonate based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. The ester-based solvent may include methyl acetate, ethyl acetate, n-propyl acetate, dimethylacetate, methylpropionate, ethylpropionate, decanolide, mevalonolactone, caprolactone, and/or the like. The ether-based solvent may include dibutyl ether, tetraglyme, diglyme, dimethoxyethane, 2-methyltetrahydrofuran, tetrahydrofuran, and/or the like. The ketone-based solvent may include cyclohexanone and/or the like. The alcohol-based solvent may include ethyl alcohol, isopropyl alcohol, and/or the like, and non-limiting examples of the aprotic solvent may include nitriles such as R—CN (where R is a $C_2$ to $C_{20}$ linear, branched, or cyclic hydrocarbon, and may include a double bond, an aromatic ring, or an ether bond), amides such as dimethylformamide, dioxolanes such as 1,3-dioxolane, sulfolanes, and/or the like.

The organic solvent may be used alone or in a mixture. When the organic solvent is used in a mixture, the mixture ratio may be controlled or selected in accordance with suitable or desirable battery performance.

The carbonate-based solvent may include a mixture of a cyclic carbonate and a linear carbonate. The cyclic carbonate and linear carbonate may be mixed together in a volume ratio of about 1:1 to about 1:9. When the mixture is used as an electrolyte, it may have enhanced performance.

The organic solvent may further include an aromatic hydrocarbon-based solvent in addition to the carbonate-based solvent. The carbonate-based solvent and the aromatic hydrocarbon-based solvent may be mixed together in a volumetric ratio of about 1:1 to about 30:1.

The aromatic hydrocarbon-based organic solvent may be an aromatic hydrocarbon-based compound represented by Chemical Formula 1:

Chemical Formula 1

In Chemical Formula 1, $R_1$ to $R_6$ may be the same or different and may each be selected from hydrogen, a halogen, a $C_1$ to $C_{10}$ alkyl group, a haloalkyl group, and combinations thereof.

Non-limiting examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and combinations thereof.

The electrolyte may further include an additive such as vinylene carbonate, an ethylene carbonate-based compound represented by Chemical Formula 2, and/or propanesultone to improve battery cycle life:

Chemical Formula 2

In Chemical Formula 2, $R_7$ and $R_8$ may be the same or different and may each independently be hydrogen, a halogen atom, a cyano group (CN), a nitro group ($NO_2$), or a $C_1$ to $C_5$ fluoroalkyl group, provided that at least one of $R_7$ and $R_8$ is a halogen atom, a cyano group (CN), a nitro group ($NO_2$), or a $C_1$ to $C_5$ fluoroalkyl group, and $R_7$ and $R_8$ are not simultaneously hydrogen.

Non-limiting examples of the ethylene carbonate-based compound may include difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate. The amount of the additive for improving cycle life may be flexibly used within an appropriate or suitable range.

The lithium salt dissolved in the organic solvent supplies the battery with lithium ions, basically operates the rechargeable lithium battery, and improves transportation (e.g. diffusion) of the lithium ions between positive and negative electrodes. Non-limiting examples of the lithium salt may include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers, for example integers from 1 to 20), LiCl, LiI, and $LiB(C_2O_4)_2$ (lithium bis(oxalato) borate; LiBOB). The lithium salt may have a concentration of about 0.1 M to about 2.0 M. When the lithium salt is included in the above concentration range, the electrolyte may have excellent performance and lithium ion mobility due to optimal or improved electrolyte conductivity and viscosity.

The rechargeable lithium battery may further include a separator between the negative electrode and the positive electrode, depending on the type or kind of battery. Non-limiting examples of a suitable separator material may include polyethylene, polypropylene, polyvinylidene fluoride, and multi-layer structures thereof such as a polyethylene/polypropylene double-layered separator, a polyethylene/polypropylene/polyethylene triple-layered separator, and/or a polypropylene/polyethylene/polypropylene triple-layered separator.

Figure 1:
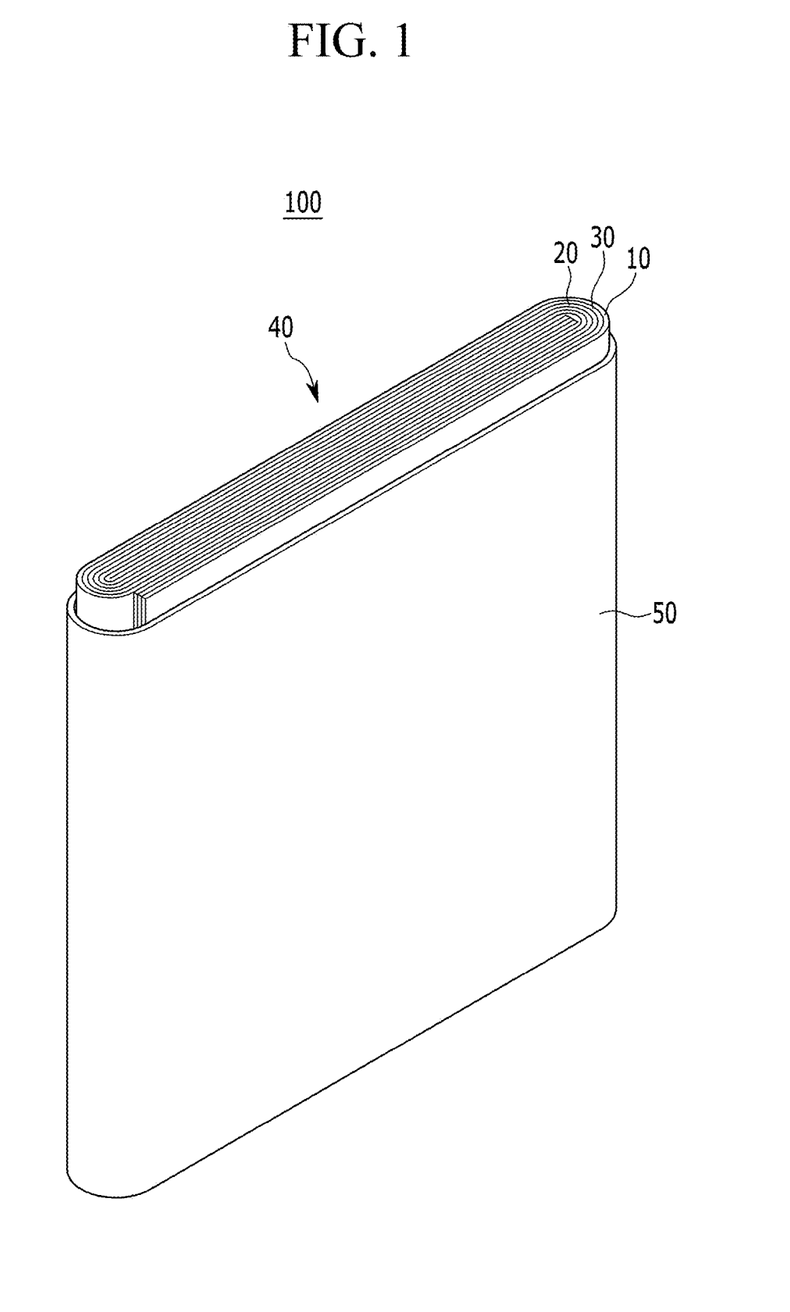
FIG. 1 is a schematic diagram showing a structure of a positive active material according to an embodiment of the present disclosure.

FIG. 1 is an exploded perspective view of a rechargeable lithium battery according to one or more embodiments of the present disclosure. The rechargeable lithium battery of FIG. 1 is illustrated as a prismatic battery, but embodiments of the present disclosure are not limited thereto and may include variously-shaped batteries such as a cylindrical battery, a pouch battery, and/or the like.

Referring to FIG. 1, a rechargeable lithium battery 100 according to one or more embodiments of the present disclosure includes an electrode assembly 40 manufactured by winding a separator 30 interposed between a positive electrode 10 and a negative electrode 20, and a case 50 housing the electrode assembly 40. An electrolyte may be impregnated in the positive electrode 10, the negative electrode 20, and the separator 30.

Hereinafter, examples describing embodiments of the present invention and comparative examples are described.

These examples, however, are not in any sense to be interpreted as limiting the scope of the invention.

Example 1

Amorphous Si particles (average particle diameter (D50): 10 nm) and $TiO_2$ particles (average particle diameter (D50): 30 nm) were mixed at a ratio of 2.2 wt %:97.8 wt %, and the mixture was fired at 750° C. in air for 8 hours to provide Si-containing $TiO_2$ particles having an average particle diameter (D50) of about 20 nm to 30 nm. The final content of the Si in the Si-containing $TiO_2$ was 3 mol % based on 100 mol % of the $TiO_2$.

$Li_2CO_3$ and $Co_3O_4$ were mixed to provide a 1:1 mole ratio of Li:Co in the resultant product, and the mixture was fired at 1050° C. in air for 12 hours. The fired product was ground to provide $LiCoO_2$ particles having an average particle diameter (D50) of 20 μm.

The Si-containing $TiO_2$ particles and the $LiCoO_2$ particles were mixed in a ratio of 0.4 wt %:99.6 wt % to provide a positive active material. The amount of Ti in the positive active material was 0.52 mol % based on 100 mol % of $LiCoO_2$. In addition, the Si-containing $TiO_2$ was present in an island shape on a surface of the $LiCoO_2$ particles.

96 wt % of the positive active material, 2 wt % of polyvinylidene fluoride and 2 wt % of Ketjenblack were mixed in a N-methyl pyrrolidone solvent to provide a positive active material slurry. The positive active material slurry was coated on an Al foil current collector, dried, and pressed to provide a positive electrode having an electrode density of 3.8 g/cc.

98 wt % of an artificial graphite negative active material and 2 wt % of a polyvinylidene fluoride binder were mixed in a N-methyl pyrrolidone solvent to provide a negative active material slurry.

The negative active material slurry was coated on a Cu foil current collector having a thickness of 10 μm, dried at 100° C., and pressed to provide a negative electrode.

1.0 M of $LiPF_6$ was dissolved in a non-aqueous organic solvent including a 3:7 volumetric ratio of ethylene carbonate and ethylmethyl carbonate to provide an electrolyte.

Using the electrolyte, the negative electrode, and the positive electrode, a rechargeable lithium battery cell was fabricated.

Example 2

A positive active material was prepared utilizing substantially the same procedure as in Example 1, except that the amorphous Si particles (average particle diameter (D50): 10 nm) and the $TiO_2$ particles (average particle diameter (D50): 30 nm) were mixed in a ratio of 3.6 wt %:96.4 wt % to provide Si-containing $TiO_2$ particles (average particle diameter (D50): 20 nm to 30 nm) in which the Si content was 5 mol % based on 100 mol % of Ti, and the Si-containing $TiO_2$ particles and the $LiCoO_2$ particles were mixed in a ratio of 0.4 wt %:99.6 wt %.

Using the positive active material, a positive electrode having an electrode density of 3.8 g/cc was prepared, and a rechargeable lithium battery cell was fabricated utilizing substantially the same procedure as in Example 1.

Example 3

A positive active material was prepared utilizing substantially the same procedure as in Example 1, except that the amorphous Si particles (average particle diameter (D50): 10 nm) and the $TiO_2$ particles (average particle diameter (D50): 30 nm) were mixed in a ratio of 7 wt %:93 wt % to provide Si-containing $TiO_2$ particles (average particle diameter (D50): 20 nm to 30 nm) in which the Si content was 10 mol % based on 100 mol % of Ti, and the Si-containing $TiO_2$ particles and the $LiCoO_2$ particles were mixed in a ratio of 0.4 wt %:99.6 wt %.

Using the positive active material, a positive electrode having an electrode density of 3.8 g/cc was prepared, and a rechargeable lithium battery cell was fabricated utilizing substantially the same procedure as in Example 1.

Example 4

A positive active material was prepared utilizing substantially the same procedure as in Example 1, except that the amorphous Si particles (average particle diameter (D50): 10 nm) and the $TiO_2$ particles (average particle diameter (D50): 30 nm) were mixed in a ratio of 10 wt %:90 wt % to provide Si-containing $TiO_2$ particles in which the Si content was 15 mol % based on 100 mol % of Ti, and the Si-containing $TiO_2$ particles and the $LiCoO_2$ particles were mixed in a ratio of 0.4 wt %:99.6 wt %.

Using the positive active material, a positive electrode having an electrode density of 3.8 g/cc was prepared, and a rechargeable lithium battery cell was fabricated utilizing substantially the same procedure as in Example 1.

Example 5

A positive active material was prepared utilizing substantially the same procedure as in Example 1, except that the amorphous Si particles (average particle diameter (D50): 10 nm) and the $TiO_2$ particles (average particle diameter (D50): 30 nm) were mixed in a ratio of 13 wt %:87 wt % to provide Si-containing $TiO_2$ particles (average particle diameter (D50): 20 nm to 30 nm) in which the Si content was 20 mol % based on 100 mol % of Ti, and the Si-containing $TiO_2$ particles and the $LiCoO_2$ particles were mixed in a ratio of 0.4 wt %:99.6 wt %.

Using the positive active material, a positive electrode having an electrode density of 3.8 g/cc was prepared, and a rechargeable lithium battery cell was fabricated utilizing substantially the same procedure as in Example 1.

Example 6

A positive active material was prepared utilizing substantially the same procedure as in Example 1, except that the amorphous Si particles (average particle diameter (D50): 10 nm) and the $TiO_2$ particles (average particle diameter (D50): 30 nm) were mixed in a ratio of 16 wt %:84 wt % to provide Si-containing $TiO_2$ particles (average particle diameter (D50): 20 nm to 30 nm) in which the Si content was 25 mol % based on 100 mol % of Ti, and the Si-containing $TiO_2$ particles and the $LiCoO_2$ particles were mixed in a ratio of 0.4 wt %:99.6 wt %.

Using the positive active material, a positive electrode having an electrode density of 3.8 g/cc was prepared, and a rechargeable lithium battery cell was fabricated utilizing substantially the same procedure as in Example 1.

Reference Example 1

A positive active material was prepared utilizing substantially the same procedure as in Example 1, except that the amorphous Si particles (average particle diameter (D50): 10 nm) and the $TiO_2$ particles (average particle diameter (D50): 30 nm) were mixed in a ratio of 18.4 wt %:81.6 wt % to provide Si-containing $TiO_2$ particles (average particle diameter (D50): 20 nm to 30 nm) in which the Si content was 30 mol % based on 100 mol % of Ti, and the Si-containing $TiO_2$ particles and the $LiCoO_2$ particles were mixed in a ratio of 0.4 wt %:99.6 wt %.

Using the positive active material, a positive electrode having an electrode density of 3.8 g/cc was prepared, and a rechargeable lithium battery cell was fabricated utilizing substantially the same procedure as in Example 1.

Reference Example 2

A positive active material was prepared utilizing substantially the same procedure as in Example 1, except that the amorphous Si particles (average particle diameter (D50): 10 nm) and the $TiO_2$ particles (average particle diameter (D50): 30 nm) were mixed in a ratio of 21 wt %:79 wt % to provide Si-containing $TiO_2$ particles (average particle diameter (D50): 20 nm to 30 nm) in which the Si content was 35 mol % based on 100 mol % of Ti, and the Si-containing $TiO_2$ particles and the $LiCoO_2$ particles were mixed in a ratio of 0.4 wt %:99.6 wt %.

Using the positive active material, a positive electrode having an electrode density of 3.8 g/cc was prepared, and a rechargeable lithium battery cell was fabricated utilizing substantially the same procedure as in Example 1.

Reference Example 3

A positive active material was prepared utilizing substantially the same procedure as in Example 1, except that the amorphous Si particles (average particle diameter (D50): 10 nm) and the $TiO_2$ particles (average particle diameter (D50): 30 nm) were mixed in a ratio of 23 wt %:77 wt % to provide a Si-containing $TiO_2$ particles (average particle diameter (D50): 20 nm to 30 nm) in which the Si content was 40 mol % based on 100 mol % of Ti, and the Si-containing $TiO_2$ particles and the $LiCoO_2$ particles were mixed in a ratio of 0.4 wt %:99.6 wt %.

Using the positive active material, a positive electrode having an electrode density of 3.8 g/cc was prepared, and a rechargeable lithium battery cell was fabricated utilizing substantially the same procedure as in Example 1.

Reference Example 4

A positive active material was prepared utilizing substantially the same procedure as in Example 1, except that the amorphous Si particles (average particle diameter (D50): 10 nm) and the $TiO_2$ (average particle diameter (D50): 30 nm) were mixed in a ratio of 27 wt %:73 wt % to provide Si-containing $TiO_2$ particles (average particle diameter (D50): 20 nm to 30 nm) in which the Si content was 50 mol % based on 100 mol % of Ti, and the Si-containing $TiO_2$ particles and the $LiCoO_2$ particles were mixed in a ratio of 0.4 wt %:99.6 wt %.

Using the positive active material, a positive electrode having an electrode density of 3.8 g/cc was prepared, and a rechargeable lithium battery cell was fabricated utilizing substantially the same procedure as in Example 1.

Reference Example 5

A positive active material was prepared utilizing substantially the same procedure as in Example 1, except that the amorphous Si particles (average particle diameter (D50): 10 nm) and the $TiO_2$ particles (average particle diameter (D50): 30 nm) were mixed in a ratio of 31 wt %:69 wt % to provide Si-containing $TiO_2$ particles (average particle diameter (D50): 20 nm to 30 nm) in which the Si content was 60 mol % based on 100 mol % of Ti, and the Si-containing $TiO_2$ particles and the $LiCoO_2$ particles were mixed in a ratio of 0.4 wt %:99.6 wt %.

Using the positive active material, a positive electrode having an electrode density of 3.8 g/cc was prepared, and a rechargeable lithium battery cell was fabricated utilizing substantially the same procedure as in Example 1.

Reference Example 6

A positive active material was prepared utilizing substantially the same procedure as in Example 1, except that the amorphous Si particles (average particle diameter (D50): 10 nm) and the $TiO_2$ particles (average particle diameter (D50): 30 nm) were mixed in a ratio of 34 wt %:66 wt % to provide Si-containing $TiO_2$ particles (average particle diameter (D50): 20 nm to 30 nm) in which the Si content was 70 mol % based on 100 mol % of Ti, and the Si-containing $TiO_2$ particles and the $LiCoO_2$ particles were mixed in a ratio of 0.4 wt %:99.6 wt %.

Using the positive active material, a positive electrode having an electrode density of 3.8 g/cc was prepared, and a rechargeable lithium battery cell was fabricated utilizing substantially the same procedure as in Example 1.

Comparative Example 1

Using $LiCoO_2$ as a positive active material, a positive electrode having an electrode density of 3.8 g/cc was prepared, and a rechargeable lithium battery cell was fabricated utilizing substantially the same procedure as in Example 1.

Comparative Example 2

$TiO_2$ particles (average particle diameter (D50): 30 nm) and $LiCoO_2$ particles were mixed in a ratio of 0.4 wt %:99.6 wt % to provide a positive active material.

Using the positive active material, a rechargeable lithium battery cell was fabricated utilizing substantially the same procedure as in Example 1.

Evaluation of Cycle-Life Characteristics

Figure 2:
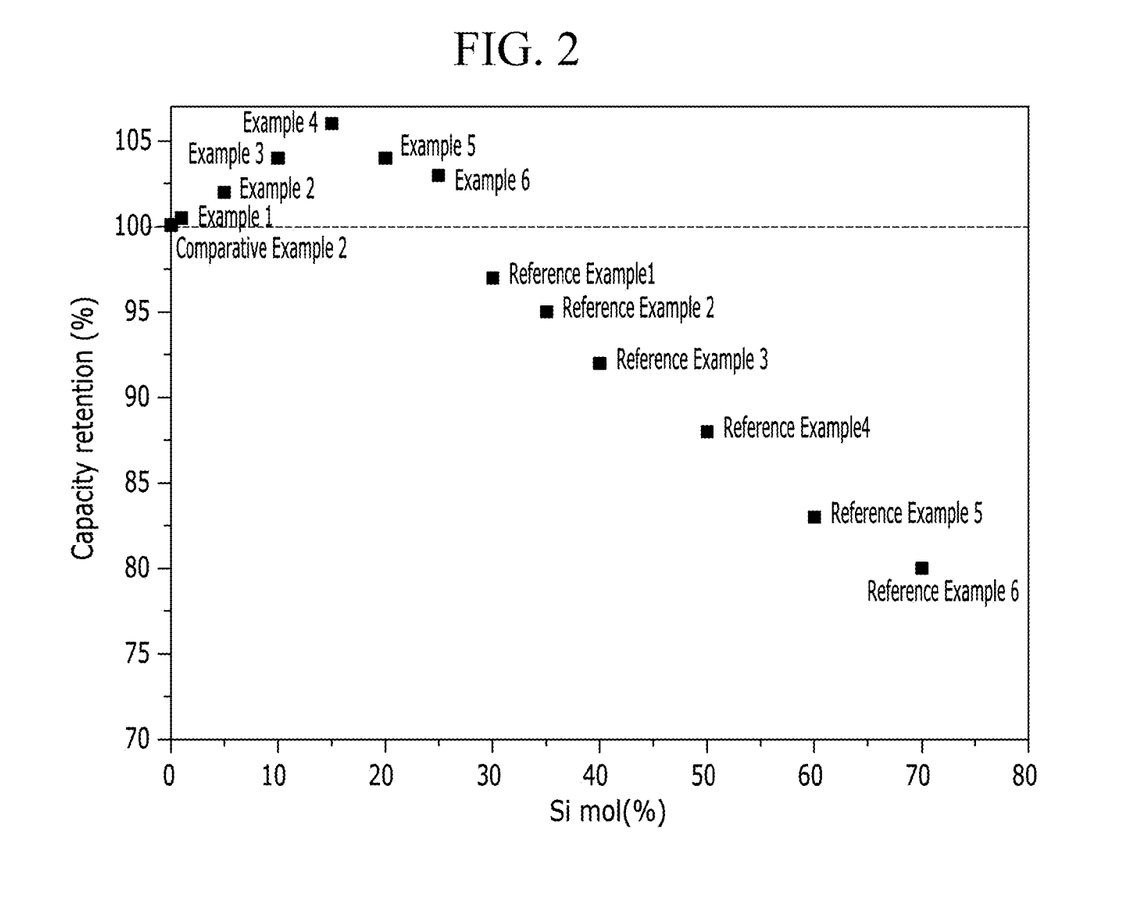
FIG. 2 is a graph showing the correlation between capacity retention (%) and Si content (mol %) for the rechargeable lithium batteries according to Examples 1 to 6, Reference Examples 1 to 6, and Comparative Example 2.

The rechargeable lithium battery cells of Examples 1 to 6, Reference Examples 1 to 6, and Comparative Example 2 were charged and discharged at 1 C for 50 cycles. The discharge capacity was measured at the end of each cycle, and the capacity retention (%) of each rechargeable lithium battery cell according to Examples 1 to 6 and Reference Examples 1 to 6 with respect to the discharge capacity of Comparative Example 2 (discharge capacity of Comparative Example 2 is assumed as 100%) was calculated. The results are shown in FIG. 2. As shown in FIG. 2, the capacity retention of each rechargeable lithium battery cell according to Examples 1 to 6 was superior to the capacity retention of Comparative Example 2. On the other hand, the rechargeable lithium battery cells according to Reference Examples 1 to 6 exhibited deteriorated capacity retention compared to Comparative Example 2.

Figure 3:
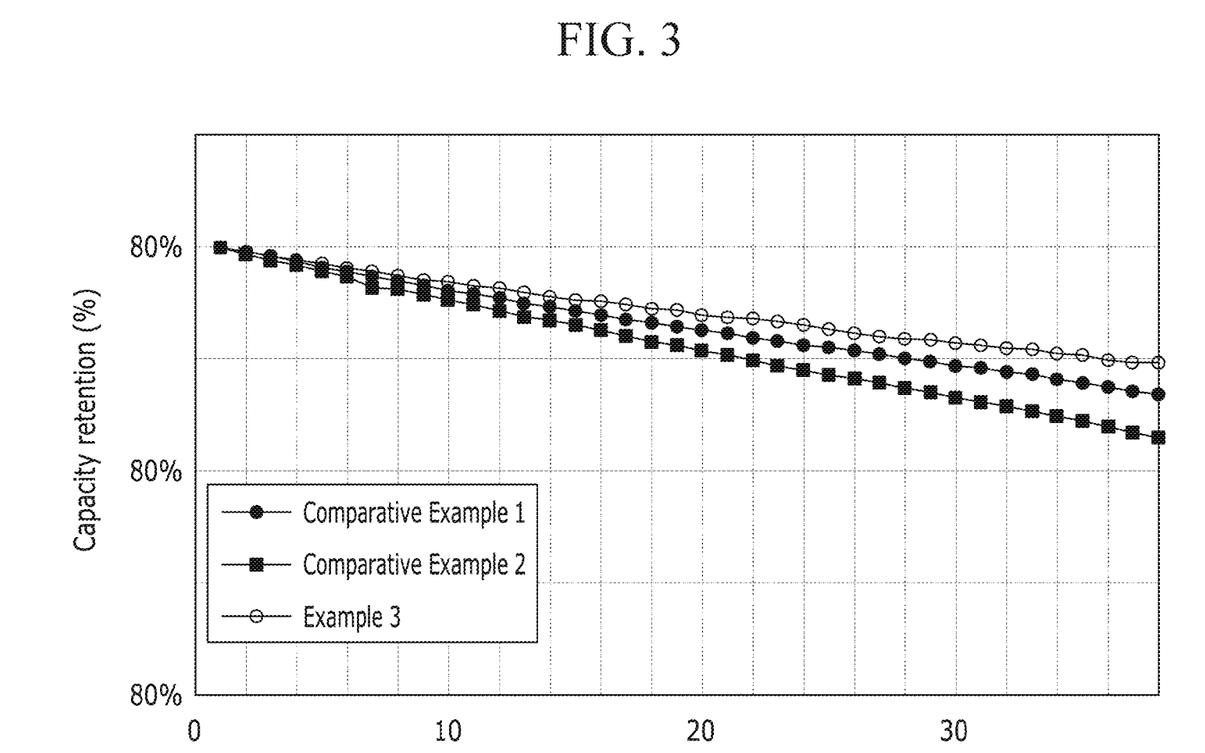
FIG. 3 is a graph showing capacity retention (%) with respect to cycle number during room temperature cycling of the rechargeable lithium batteries according to Example 3 and Comparative Examples 1 and 2.

In addition, the rechargeable lithium battery cells according to Example 3 and Comparative Examples 1 and 2 were charged and discharged at 1 C under constant current conditions at 25° C. over 40 cycles. The discharge capacity was measured at the end of each cycle, and the capacity retention (%) for each cycles was calculated with respect to the first cycle discharge capacity. The change in capacity retention with respect to cycle is shown in FIG. 3. As shown in FIG. 3, the capacity retention of the rechargeable lithium battery cell according to Example 3 was higher than that of Comparative Example 1; while the capacity retention of the rechargeable lithium battery cell according to Comparative Example 2 was lower than that of Comparative Example 1. The results shown in FIG. 3 demonstrate that battery cycle-life characteristics were improved when Si—$TiO_2$ was coated on the surface of $LiCoO_2$, compared to uncoated $LiCoO_2$, and that the cycle-life characteristics deteriorated when only $TiO_2$ was coated on the surface of $LiCoO_2$, compared to uncoated $LiCoO_2$.

Figure 4:
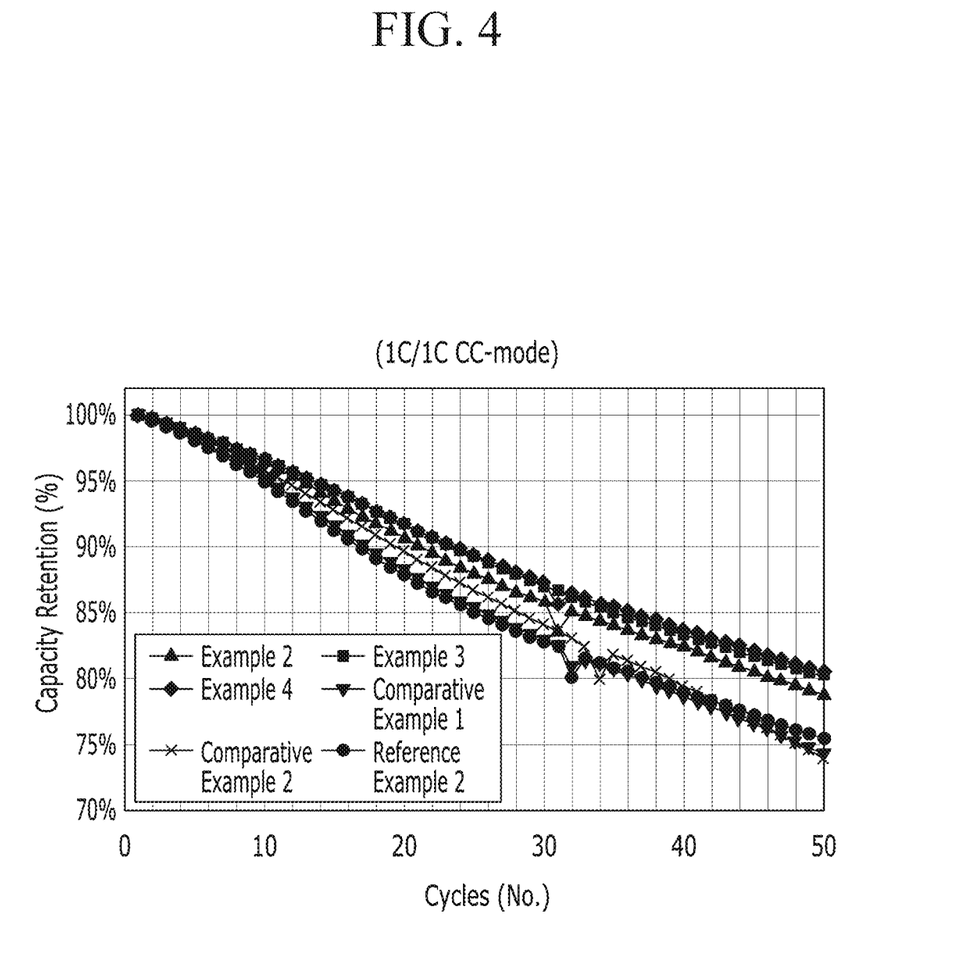
FIG. 4 is a graph showing capacity retention (%) with respect to cycle number during high temperature (45° C.) cycling of the rechargeable lithium batteries according to Examples 2 to 4, Comparative Examples 1 to 2, and Reference Example 2.

In addition, the rechargeable lithium battery cells of Examples 2 to 4, Comparative Examples 1 to 2, and Reference Example 2 were charged and discharged at 45° C. under constant current conditions (1 C charge and 1 C discharge) over 50 cycles, and the capacity retention (%) for each cycle was calculated with respect to the first cycle discharge capacity, as shown in FIG. 4.

As shown in FIG. 4, the capacity retentions of the rechargeable lithium battery cells according to Examples 2 to 4 were excellent, compared to those of Comparative Examples 1 and 2 and Reference Example 1. The results of FIG. 4 demonstrate that cycle-life characteristics may be improved when an appropriate or suitable amount of Si—$TiO_2$ is coated on the surface of $LiCoO_2$, compared to uncoated $LiCoO_2$; however, when an excessive amount of Si—$TiO_2$ is present, the cycle-life characteristics may be deteriorated, compared to the uncoated $LiCoO_2$.

Storage Characteristics at High Temperature

Figure 5:
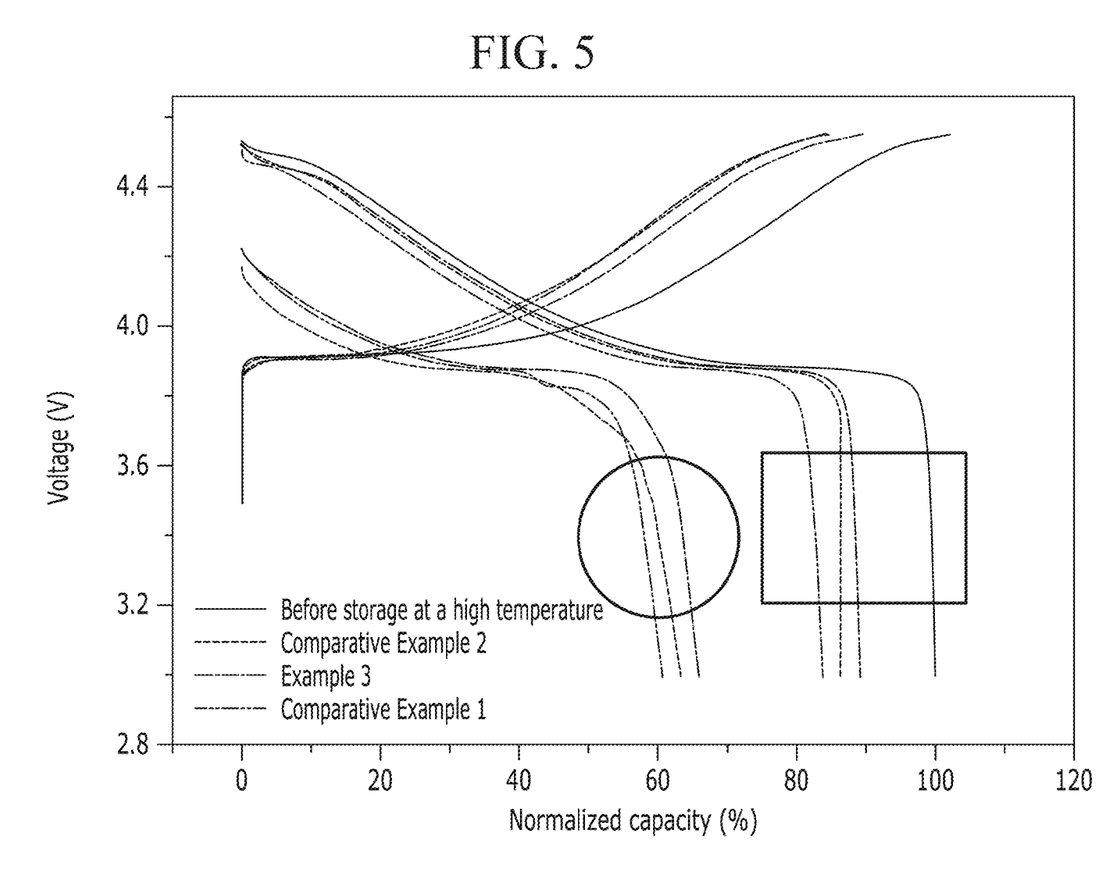
FIG. 5 is a graph showing charge and discharge (voltage-capacity) curves before and after storage at high temperature (85° C.) for the rechargeable lithium batteries according to Example 3 and Comparative Examples 1 and 2.

The rechargeable lithium battery cells according to Example 3 and Comparative Examples 1 and 2 were charged and discharged at 0.2 C for one cycle, and the charge and discharge voltage-capacity curves were measured prior to storage at a high temperature. In addition, the rechargeable lithium battery cells according to Example 3 and Comparative Examples 1 and 2 were charged to 100% state of charge (SOC) (e.g., at a charged state of providing a charge capacity of 100% of the entire charge capacity of the battery) and then stored at 85° C. for 5 hours, then a charge and discharge cycle was carried out at 0.5 C. The charge and discharge voltage-capacity curves in this case show the retention characteristics (e.g., ability of the battery to retain its capacity prior to high temperature storage). Subsequently, the battery which had been initially charged and discharged at 0.5 C was charged and discharged at 0.2 C for one time, and the charge and discharge voltage-capacity curves in this case show the recovery characteristics (e.g., ability of the battery to recover lost capacity after further cycling). Generally, high temperature storage characteristics are measured with respect to the recovery characteristic.

The measured results are shown in FIG. 5. The solid trace in FIG. 5 shows that the characteristics of each of the battery cells of Example 3, Comparative Examples 1 and 2 have very similar charge and discharge curves before high temperature storage. From FIG. 5, it is confirmed that both the retention characteristics (left traces, by the circle in FIG. 5) and the recovery characteristics (right traces, indicated by the square in FIG. 5) were higher in Example 3 than in Comparative Examples 1 and 2, showing that the recovery characteristics and high temperature storage characteristics of Example 3 were improved.

Example 7

Amorphous Si particles (average particle diameter (D50): 10 nm) and $TiO_2$ particles (average particle diameter (D50): 30 nm) were mixed in a ratio of 10 wt %:90 wt %, and the mixture was fired at 750° C. for 8 hours under an air atmosphere to provide Si-containing $TiO_2$ particles having an average particle diameter (D50) of 20 nm to 30 nm. In the obtained Si-containing $TiO_2$ particles, the Si content was 15 mol % based on 100 mol % of Ti.

$Li_2CO_3$ and $Co_3O_4$ were mixed to provide a 1:1 Li:Co mole ratio, and the mixture was fired at 1050° C. for 12 hours under an air atmosphere. The fired product was pulverized to provide $LiCoO_2$ particles having an average particle diameter (D50) of 20 μm.

The Si-containing $TiO_2$ particles and $LiCoO_2$ particles were mixed in a ratio of 0.08 wt %:99.92 wt % to provide a positive active material. In this case, the Ti content in the positive active material was 0.1 mol % based on 100 mol % of the $LiCoO_2$. In addition, the Si-containing $TiO_2$ was present in an island shape on the surface of $LiCoO_2$.

96 wt % of the positive active material, 2 wt % of polyvinylidene fluoride, and 2 wt % of Ketjenblack were mixed in a N-methyl pyrrolidone solvent to provide a positive active material slurry. The positive active material slurry was coated on an Al foil, dried, and pressed to provide a positive electrode.

98 wt % of an artificial graphite negative active material and 2 wt % of a polyvinylidene fluoride binder were mixed in a N-methyl pyrrolidone solvent to provide a negative active material slurry.

The negative active material slurry was coated on a Cu foil having a thickness of 10 μm and dried and pressed to provide a negative electrode.

1.0M of $LiPF_6$ was dissolved in a non-aqueous organic solvent including a 3:7 volumetric ratio of ethylene carbonate and ethylmethyl carbonate to provide an electrolyte.

Using the electrolyte, the negative electrode, and the positive electrode, a rechargeable lithium battery cell was fabricated.

Example 8

A positive active material was prepared utilizing substantially the same procedure as in Example 7, except that the Si-containing $TiO_2$ particles and $LiCoO_2$ particles were mixed in a ratio of 0.66 wt %:99.34 wt %. In this case, the Ti content in the positive active material was 0.83 mol % based on 100 mol % of the $LiCoO_2$.

A rechargeable lithium battery cell was fabricated utilizing substantially the same procedure as in Example 7, using the positive active material.

Example 9

A positive active material was prepared utilizing substantially the same procedure as in Example 7, except that the Si-containing $TiO_2$ particles and $LiCoO_2$ particles were mixed in a ratio of 1.22 wt %:98.78 wt %. In this case, the Ti content in the positive active material was 1.5 mol % based on 100 mol % of the $LiCoO_2$.

Using the positive active material, a rechargeable lithium battery cell was fabricated utilizing substantially the same procedure as in Example 7.

ICP (Inductively Coupled Plasma) Measurement

The Ti content in each positive active material according to Examples 1 to 9, Reference Examples 1 to 5, and Comparative Examples 1 and 2 was measured utilizing inductively coupled plasma mass spectrometry (ICP-MS), and the results based on 100 mol % of $LiCoO_2$ are shown in the following Table 1.

TABLE 1

| | Ti content (mol %) |
|---|---|
| Example 1 | 0.52 |
| Example 2 | 0.51 |
| Example 3 | 0.48 |
| Example 4 | 0.5 |
| Example 5 | 0.49 |
| Example 6 | 0.51 |
| Example 7 | 0.09 |
| Example 8 | 0.83 |
| Example 9 | 1.48 |
| Reference Example 1 | 0.49 |
| Reference Example 2 | 0.51 |
| Reference Example 3 | 0.47 |
| Reference Example 4 | 0.53 |
| Reference Example 5 | 0.51 |
| Comparative Example 1 | 0 |
| Comparative Example 2 | 0.54 |

Evaluation of Rate Capability

The rechargeable lithium battery cells according to Examples 4 and 7 to 9 and Comparative Examples 1 and 2 were charged and discharged between 3.0V to 4.6V and at 0.1 C, 0.2 C, 1 C, and 2 C for a total of four cycles, and the discharge capacity at each discharge rate was measured. Table 2 shows the 0.2 C discharge capacity, the percentage ratio of the 1 C discharge capacity to the 0.1 C discharge capacity and the percentage ratio of the 2 C discharge capacity to the 0.2 C discharge capacity:

TABLE 2

| | 0.2 C discharge capacity (mAh/g) | 1 C discharge capacity/0.1 C discharge capacity, % | 2 C discharge capacity/0.2 C discharge capacity, % |
|---|---|---|---|
| Comparative Example 1 | 220 | 93 | 87 |
| Comparative Example 2 | 221 | 94 | 88 |
| Example 7 | 222 | 94 | 88 |
| Example 4 | 220 | 95 | 89 |
| Example 8 | 220 | 95 | 89 |
| Example 9 | 221 | 96 | 90 |

As shown in Table 2, the rechargeable lithium battery cells according to Examples 4 and 7 to 9 had superior high rate discharge characteristics compared to those of Comparative Examples 1 and 2.

Low Temperature Characteristic Results

Figure 6:
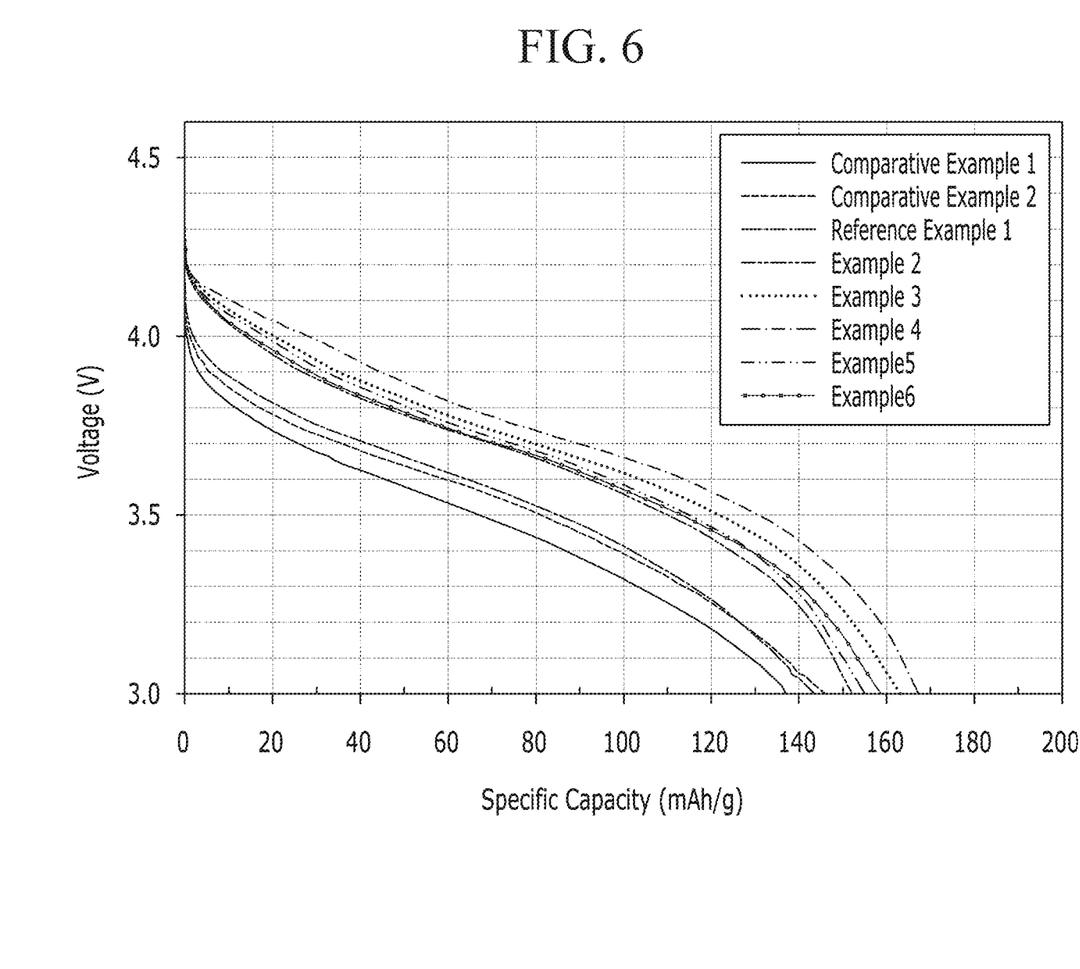
FIG. 6 is a graph showing charge and discharge (voltage-capacity) curves at low temperature (−15° C.) for the rechargeable lithium batteries according to Examples 2 to 6, Comparative Examples 1 and 2, and Reference Example 1.

The rechargeable lithium battery cells according to Examples 2 to 6, Comparative Examples 1 and 2, and Reference Example 1 were charged and discharged at −15° C. and at 0.5 C for one cycle, and the results are shown in FIG. 6. FIG. 6 shows that the rechargeable lithium battery cells according to Examples 2 to 6 had more favorable characteristics at a low temperature than those of Comparative Examples 1 and 2 and Reference Example 1.

SEM Images

Figure 7A:
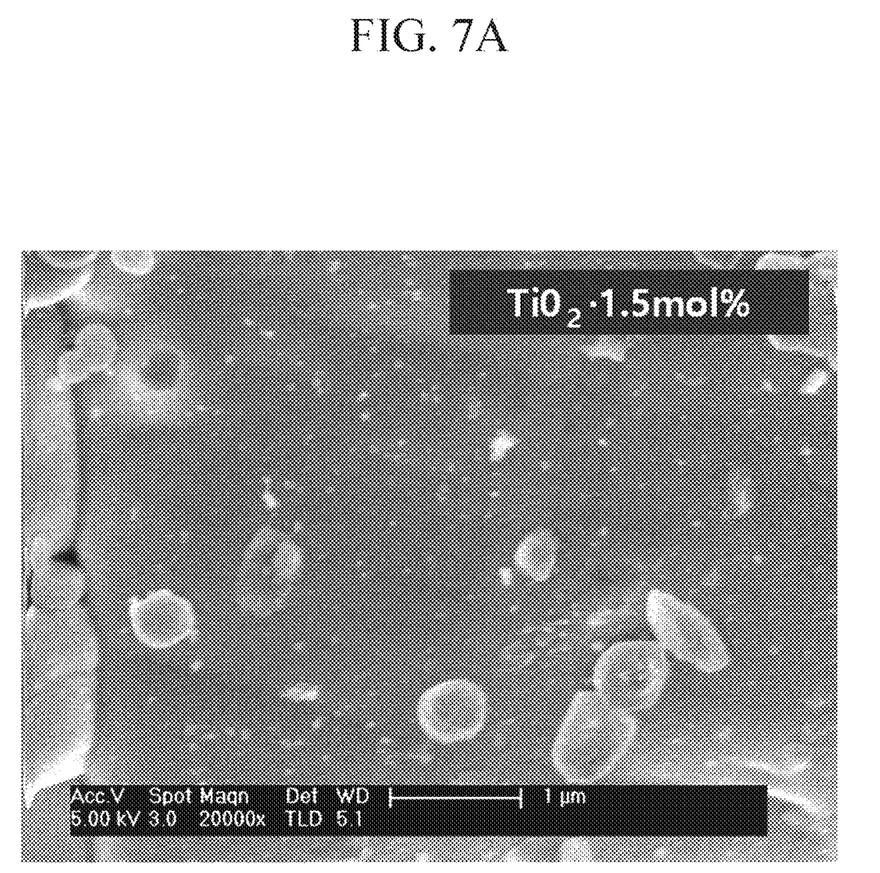
FIG. 7A is a scanning electron microscope (SEM) image showing a surface of the positive active material of Example 9 (1.5 mol % $TiO_2$) at 20,000× magnification.
Figure 7B:
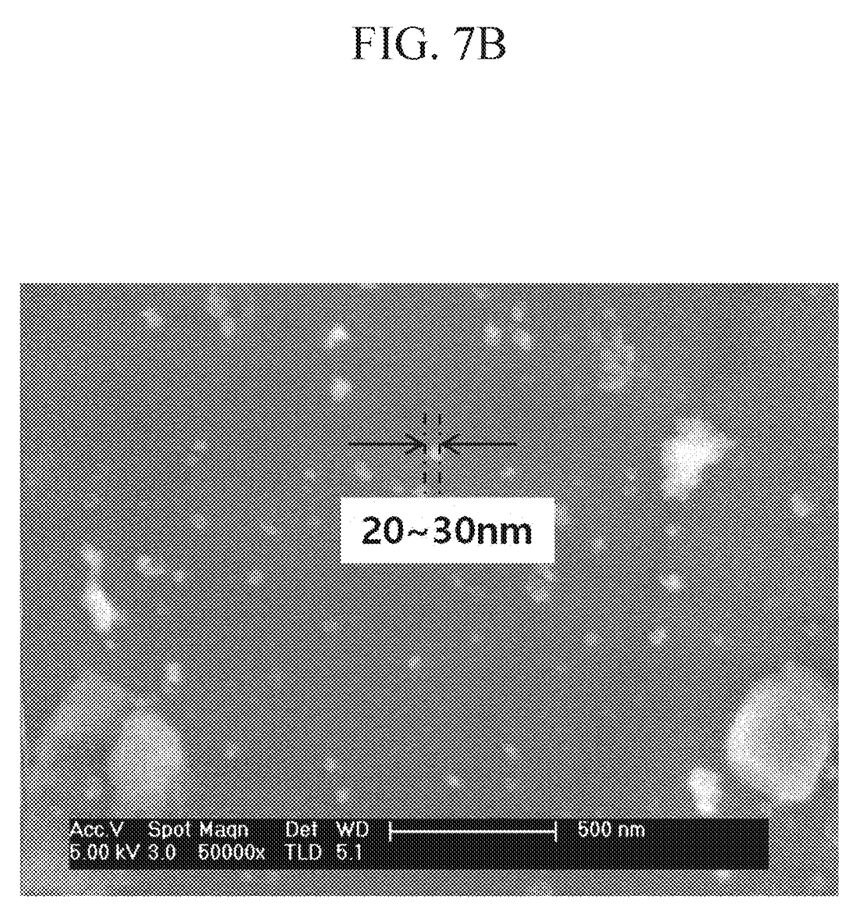
FIG. 7B is a SEM image showing a surface of the positive active material of Example 9 at 50,000× magnification.

FIGS. 7A (20000× magnification) and 7B (50000× magnification) show SEM images of the surface of the positive active material according to Example 9.

In FIGS. 7A and 7B, the white dots correspond to $TiO_2$, and the dashed guidelines in FIG. 7B indicates the size of $TiO_2$ to be 20 nm to 30 nm.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims and equivalents thereof.

What is claimed is:

1. A positive active material for a rechargeable lithium battery, the positive active material comprising:
   a lithium intercalation compound, and
   a composite formed from a mixture of Si and $TiO_2$ on the surface of the lithium intercalation compound,
   wherein the Si is included in a molar amount of about 0.1 mol % to about 25 mol % based on 100 mol % of the Ti.

2. The positive active material of claim 1, wherein the Ti is included in a molar amount of about 0.05 mol % to about 2.0 mol % based on 100 mol % of the lithium intercalation compound.

3. The positive active material of claim 1, wherein the composite formed from the mixture of Si and $TiO_2$ is included in an amount of about 0.04 wt % to about 1.6 wt % based on 100 wt % of the lithium intercalation compound.

4. The positive active material of claim 1, wherein the composite formed from the mixture of Si and $TiO_2$ has an average particle diameter (D50) of about 10 nm to about 300 nm.

5. The positive active material of claim 1, wherein the composite formed from the mixture of Si and $TiO_2$ has a layer-type or island-type form on the surface of the lithium intercalation compound.

6. The positive active material of claim 1, wherein the composite formed from the mixture of Si and $TiO_2$ is present on the surface of the lithium intercalation compound in a thickness of about 20 nm to about 300 nm.

7. The positive active material of claim 1, wherein the lithium intercalation compound has an average particle diameter (D50) of about 15 μm to about 20 μm.

8. A rechargeable lithium battery comprising:
   a positive electrode including the positive active material of claim 1;
   a negative electrode including a negative active material; and
   an electrolyte.

9. The rechargeable lithium battery of claim 8, wherein the Ti is included in a molar amount of about 0.05 mol % to about 2.0 mol % based on 100 mol % of the lithium intercalation compound.

10. The rechargeable lithium battery of claim 8, wherein the composite formed from the mixture of Si and $TiO_2$ is included in an amount of about 0.04 wt % to about 1.6 wt % based on 100 wt % of the lithium intercalation compound.

11. The rechargeable lithium battery of claim 8, wherein the composite formed from the mixture of Si and $TiO_2$ has an average particle diameter (D50) of about 10 nm to about 300 nm.

12. The rechargeable lithium battery of claim 8, wherein the composite formed from the mixture of Si and $TiO_2$ has a layer-type or island-type form on the surface of the lithium intercalation compound.

13. The rechargeable lithium battery of claim 8, wherein the composite formed from the mixture of Si and $TiO_2$ is present on the surface of the lithium intercalation compound in a thickness of about 20 nm to about 300 nm.

14. The rechargeable lithium battery of claim 8, wherein the lithium intercalation compound has an average particle diameter (D50) of about 15 μm to about 20 μm.

15. A method of forming a positive active material for a rechargeable lithium battery, the method comprising:
- providing a lithium intercalation compound; and
- coating a composite formed from a mixture of Si and $TiO_2$ on the surface of the lithium intercalation compound, wherein the Si is included in a molar amount of about 0.1 mol % to about 25 mol % based on 100 mol % of the Ti.

16. The method of claim 15, wherein the composite formed from the mixture of Si and $TiO_2$ is coated in a layer-type or island-type form on the surface of the lithium intercalation compound.

* * * * *